T. B. DAVIS.
TRACTOR.
APPLICATION FILED SEPT. 30, 1918.

1,335,489.

Patented Mar. 30, 1920.
2 SHEETS—SHEET 1.

Theadore B. Davis
Inventor

By Lancaster and Allwine
Attorneys

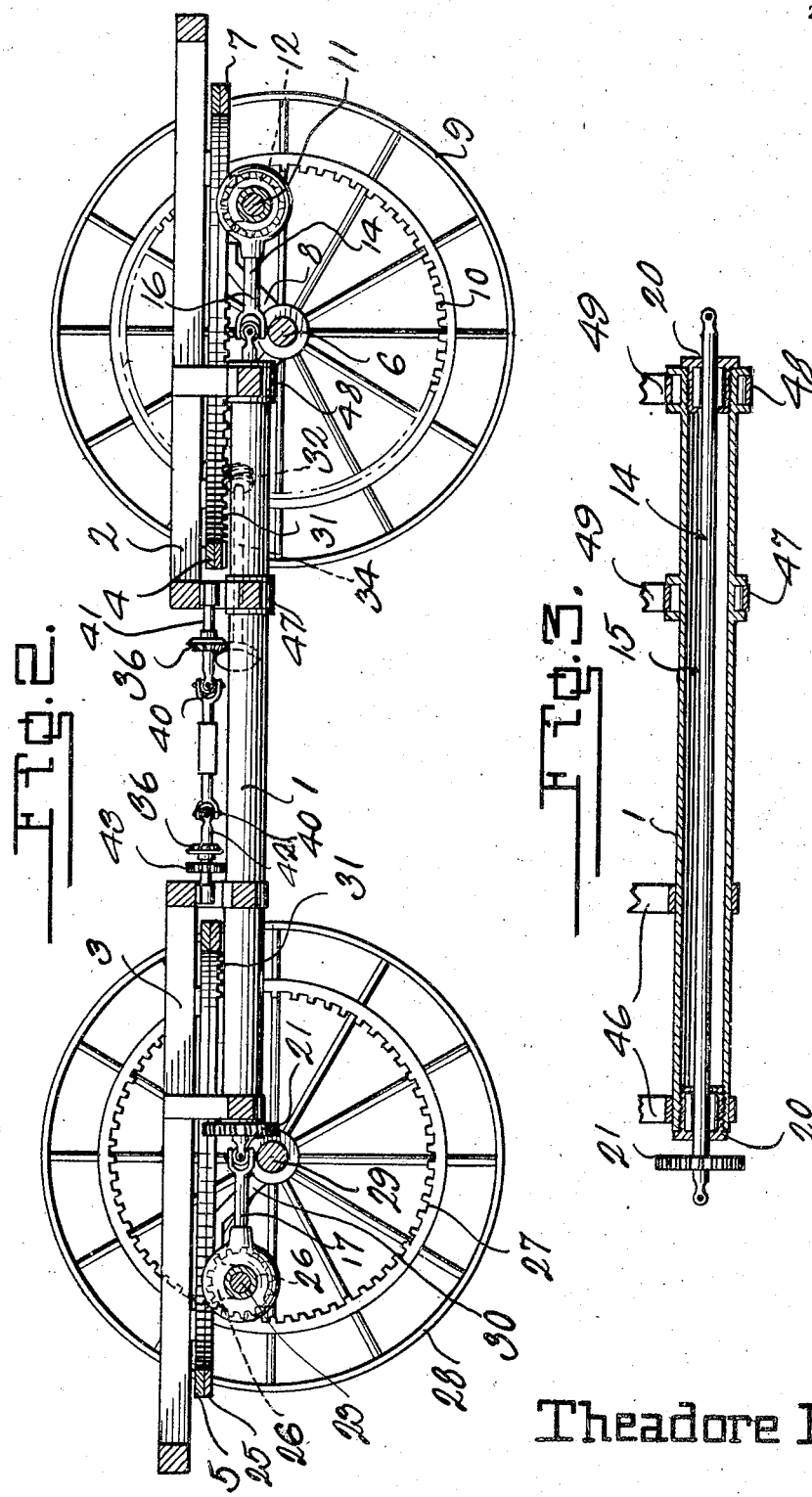

UNITED STATES PATENT OFFICE.

THEADORE B. DAVIS, OF PENNVILLE, INDIANA.

TRACTOR.

1,335,489.  Specification of Letters Patent.  Patented Mar. 30, 1920.

Application filed September 30, 1918. Serial No. 256,303.

*To all whom it may concern:*

Be it known that I, THEADORE B. DAVIS, a citizen of the United States and residing at Pennville, in the county of Jay and State of Indiana, have invented certain new and useful Improvements in Tractors, of which the following is a specification.

This invention relates to tractors, and an object of the invention is to provide a tractor which may be turned in a comparatively small space, and one which will also be light in weight, in proportion to its tractive power.

Farm tractors now in use are generally heavy in proportion to their tractive powers and cannot be turned so as to pull farm implements and machinery, properly at corners or in making turns, such as in plowing, mowing etc.; and it is an object of this invention to provide a tractor, including mechanism for driving its front and rear wheels and consequently increasing the tractive power thereof, permitting the construction of a light tractor compared to its tractive power and further to provide steering means connected to both the front and rear wheels which enable the tractor to make very short turns and allow it to exert tractive power under all conditions.

Other objects of the invention, are to provide a tractor which may be run with equal efficiency in either direction, thereby permitting the use of a right and a left hand turning plow in connection therewith, eliminating the necessity of turning at the end of a furrow, when breaking land and also permitting the breaking of a field without the formation of a dead or bed furrow; to provide, in a power transmitting mechanism for the front and rear wheels of the tractor, means to prevent the drive shaft from being forced or moved out of proper alinement when one of the wheels of the tractor passes over a rut or uneven place in the surface over which it is traveling; to provide, in the steering mechanism, a telescopic connection to permit limited expansion and contraction of the length of the steering shaft to compensate for uneven and ununiform movements of the front and rear sections of the tractor.

Other objects of the invention will appear in the following detailed description, taken in connection with the accompanying drawings, forming a part of this specification, and in which drawings:

Fig. 2 is a vertical longitudinal section through the tractor, and

Fig. 3 is a fragmentary longitudinal section through a part of the power transmitting construction of the tractor.

Figure 1:
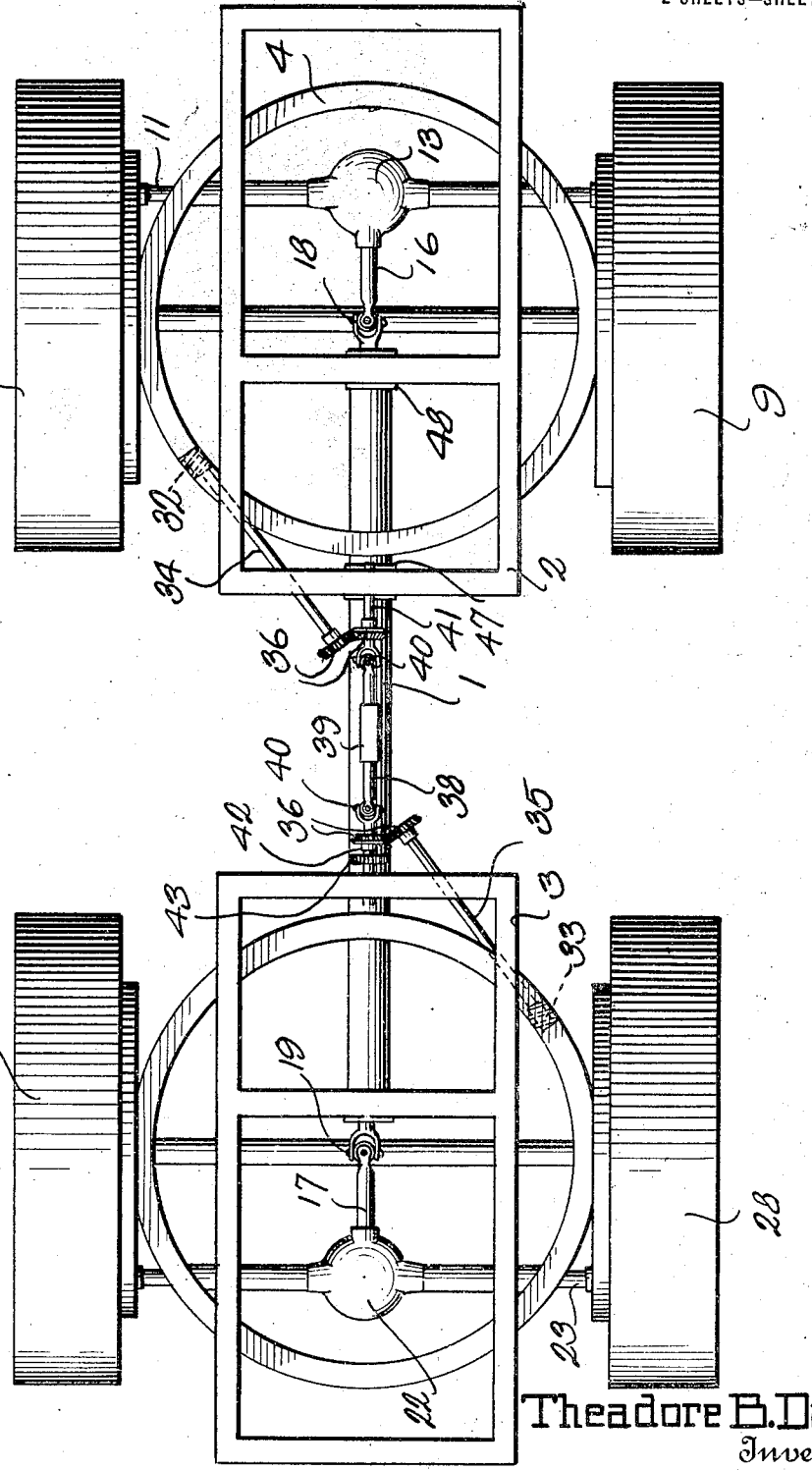
Figure 1 is a plan view of the chassis of the tractor.

Referring more particularly to the drawings, wherein like characters indicate like and corresponding parts throughout the several views, 1 indicates the coupling tube as an entirety, which indirectly connects the front and rear supporting frames 2 and 3. The supporting frames 2 and 3 are supported from relatively flat rings 4 and 5 respectively, to which rings the frames 2 and 3 are bolted.

The front axle 6 of the tractor is supported from a second ring 7, the upper surface of which lies in facial abutment with the upper surface of the ring 4, by suitable bearings 8. The axle 6 has traction wheels 9 mounted thereon each of which has an internal gear 10 connected thereto. The traction wheels 9 are driven from the front power axle 11, through the medium of pinions 12 mounted upon the front drive axle or shaft, which pinions mesh with the internal gears 10. The front drive axle 11 is connected, by means of the usual type of differential indicated at 13 to the power shaft generically indicated at 14. This power shaft 14 comprises an intermediate section 15 and a front section 16 and rear section 17. The front and rear sections 16 and 17 are connected to the intermediate section 15 by universal joints as shown at 18 and 19, said joints being provided to maintain operative connection between the front and rear sections and the intermediate section, at all times, under the different positions of the front and rear sections of the tractor, and when turning.

The intermediate portion 15 of the power shaft 14 is inclosed in the connecting or coupling bar 1, being rotatably mounted in detachable bearings 20 carried in the ends of this tubular coupling 1. A gear 21 is mounted upon the shaft 14 and is adapted for operative connection to a prime mover, such as an internal combustion engine, of any approved type which may be carried by the tractor structure.

The rear section 17 of the power shaft 14 is connected, by means of a differential indicated at 22 to the rear drive shaft 23. This shaft is rotatably supported by suitable bearings which are carried by the ring 25 the upper surface of which lies in facial abutment with the under surface of the ring 5 to which the rear frame 3 is connected. The rear drive axle 23 has pinions 26 mounted thereon which mesh with internal gears 27 carried by the rear traction wheels 28, and thus it will be seen that power is transmitted to both the front wheels 9 and to the rear wheels 28, for making all of the wheels tractive, and consequently increasing the tractive power of the tractor.

The rear wheels 28 are supported upon the rear supporting axle 25 which is supported, by suitable bearings 30 from the circular member 25.

The circular members 7 and 25 have worm teeth as indicated at 31 formed upon their under surfaces, and worms 32 and 33 mesh with the teeth of the front and rear ring members respectively. The worms 32 and 33 are carried by shafts 34 and 35, respectively which are connected, by means of sets of beveled gears 36, to the steering shaft 38. This steering shaft 38 comprises an intermediate section 39, which is formed of telescopic portions, to permit the extension or contraction of the length of this intermediate portion upon movement of the front and rear sections of the tractor so as to maintain a proper connection between the sets of beveled gears 36. The intermediate section 39 is connected by means of universal joints 40 to the end sections 41 and 42 respectively. The end section 41 has one of the beveled gears of one set 36 mounted thereon while one of the beveled gears of the other set 36 is mounted upon the end 42. The end section 42 of the steering shaft also has a gear 43 mounted thereon which may be operatively connected to the prime mover of the tractor to permit the tractor to be steered by power or this gear may be connected to any suitable type of steering means for operating the shaft 38 and transmitting operation of this shaft to the circular members 7 and 25, for steering the front and rear sections 2 and 3 of the tractor, in unison.

The tubular coupling bar 1 is connected to the rear frame 3 by suitable hangers 46 and it is supported at its front end by bearings 47 and 48 which are in turn supported from the front frame 2 by hangers 49. The bearings 47 and 48 are provided to permit rotation of the tubular coupling 1 which also forms a housing for the intermediate portion 15 of the power shaft 14, to rotate or twist, upon movement of the front and rear traction wheels, caused by traveling over rough or uneven surfaces, so as to prevent the movement of the shaft 15 out of its proper alinement.

It is to be understood, that an approved type of selective gears of multiple speed may be connected to the gear 21.

Generically, the operation of the tractor is as follows: The power for rotating the traction wheels 9 and 28, is distributed thereto through the medium of the power transmitting shaft 14, pinions 12 and 26 and internal gears 10 and 27 for driving both the front and rear sets of traction wheels, so as to maintain a firm tractive engagement with the surface over which the tractor is traveling, under all conditions, and when turning or rounding corners with the tractor. The provision of the universal joints 18 and 19 will permit the transmission of power from the shaft 14 to the end sections 16 and 17, under various conditions, such as the turning of the tractor. The front and rear sections are steered in unison, by means of the steering mechanism, to enable the tractor to turn in a relatively short space.

Changes in details may be made without departing from the spirit of this invention; but

I claim:

1. In a tractor, the combination of front and rear substantially rectangular stationary independent frames, annular guide tracks carried by the frames, annular supporting frames mounted on said tracks for movement around the same, axles carried by the supporting frames, traction wheels mounted on the axles, internal ring gears carried by the traction wheels, a coupling tube rigidly carried by the rear section and rotatably secured to the front section, a power shaft rotatably mounted in the tube driving shafts, supported by the annular supporting members arranged beyond the terminals of the tube, gears mounted on the outer terminals of the last mentioned shafts and meshing with the ring gears, relatively short shafts having universal joint connections with the terminals of the power shaft, and a differential gear connecting the outer terminals of the relatively short shafts with the drive shafts.

2. In a tractor, the combination with a pair of independent stationary frames, annular guide tracks secured to the lower surface of the frames, annular supporting members mounted on the tracks for movement around the same, teeth formed on said tracks, axles carried by the annular supporting frames for movement therewith, traction wheels mounted on the axles, means for rotating the traction wheels, a steering shaft including outer sections having their outer terminals rotatably carried by the frames, and an intermediate section having universal joint connection with the outer sections, diagonal shaft sections carried by the frames, means operatively connecting the diagonal shaft sections with the outer shaft sections, and worms carried by the outer ends of the diagonal shafts and meshing with the teeth of the annular supporting members.

THEADORE B. DAVIS.